(12) United States Patent
Belknap et al.

(10) Patent No.: US 7,979,422 B2
(45) Date of Patent: Jul. 12, 2011

(54) HYBRID OPTIMIZATION STRATEGIES IN AUTOMATIC SQL TUNING

(75) Inventors: Peter Belknap, Redwood City, CA (US);
Khaled Yagoub, Newark, CA (US);
Karl Dias, Foster City, CA (US); Benoit Dageville, Foster City, CA (US);
Thierry Cruanes, Foster City, CA (US);
Anupam Singh, San Jose, CA (US)

(73) Assignee: Oracle International Corp., Redwood Shores, CA (US)

( * ) Notice: Subject to any disclaimer, the term of this patent is extended or adjusted under 35 U.S.C. 154(b) by 413 days.

(21) Appl. No.: 12/221,131

(22) Filed: Jul. 30, 2008

(65) Prior Publication Data
US 2010/0030758 A1    Feb. 4, 2010

(51) Int. Cl.
*G06F 17/30* (2006.01)
(52) U.S. Cl. .................................................. 707/713
(58) Field of Classification Search ................ 707/2, 5, 707/4, 713
See application file for complete search history.

(56) References Cited

U.S. PATENT DOCUMENTS
2005/0262046 A1 * 11/2005 Day et al. ...................... 707/2
* cited by examiner

*Primary Examiner* — Etienne P LeRoux
(74) *Attorney, Agent, or Firm* — Kraguljac & Kalnay, LLC

(57) ABSTRACT

Systems, methods, and other embodiments associated with hybrid optimization strategies in automatic SQL tuning are described. One example method includes receiving a first (e.g., cost-based) execution plan for a user structured query language statement (User SQL) from a first (e.g., cost-based) optimizer. The example method may also include receiving a second (e.g., rules-based) execution plan for the User SQL from a second, different (e.g., rules-based) query optimizer. The method may include identifying a preferred execution plan based on data produced by test executing the execution plans in a reproduced execution environment that reproduces at least a portion of an execution environment in which the user SQL runs. The method may also include controlling a database to execute the User SQL using the preferred execution plan.

20 Claims, 7 Drawing Sheets

HYBRID OPTIMIZATION STRATEGIES IN AUTOMATIC SQL TUNING

CROSS REFERENCE TO RELATED APPLICATIONS

This application is related to the following U.S. patent application, which is assigned to the present assignee: "Test Execution Of User SQL In Database Server Code", Ser. No. 12/217,249 filed Jul. 2, 2008, inventors: PETER BELKNAP, KHALED YAGOUB, KARL DIAS, BENOIT DAGEVILLE.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Before executing a structured query language (SQL) statement, a database may create a detailed, comprehensive plan for executing the SQL statement. The plan may be referred to as an execution plan. How the data is retrieved can significantly impact how long it will take to execute an SQL statement. How the SQL statement is executed can also significantly impact the performance of an SQL statement. SQL performance may be measured in terms of system resources consumed and total response time. The system resources may include, for example, central processing unit (CPU) time, input/output (I/O) requests, and so on. An execution plan may include, among other things, a strategy for retrieving data. Conventionally, if the decision about how to retrieve data has been guided, it has been guided by a database component referred to as a query optimizer. Query optimizers have employed different optimization strategies including, for example, a cost based optimizer (CBO), and a rule based optimizer (RBO). An RBO chooses an execution plan for an SQL statement based on a rules-based analysis of how the SQL statement is written. A CBO chooses an execution plan for an SQL statement based on data statistics. A CBO may check several possible execution plans, compute a cost for the different execution plans, and select the one with the lowest cost. The cost may be computed with respect to system resources (e.g., memory, processor cycles). However, when new objects are created, when the amount of data in the database changes, when the characteristics of data in the database changes, and when other actions occur, the statistics may no longer represent the real state of the database and thus the decision of a CBO may be seriously impaired. Similarly, without information concerning characteristics of the data, the ability of an RBO to select a best execution plan may be limited.

SQL performance is a critical component of the overall performance of a database system. However, SQL performance has conventionally been one of the least manageable components of a database system. An execution plan may be selected to control how an SQL statement runs. On different runs of the SQL statement, different execution plans may be selected. Although an execution plan for an SQL statement may have previously been verified a query optimizer may not be constrained to use only that selected, verified execution plan and thus may change to a non-verified execution plan. Thus, a query optimizer may choose different execution plans for different runs of an SQL statement. The execution plan chosen may have never been tested. Additionally, underlying data and/or assumptions may have changed, which may cause even previously verified execution plans to perform poorly in the changed conditions, leading to undesirable performances at unpredictable times. Conventionally, if performance analysis has been performed at all, it has included significant manual activity that reacts to execution issues.

One conventional SQL tuning logic implements an automated tuning process that examines statements in isolation and performs two kinds of analysis. A first type of analysis is a rules-based analysis. The rules-based analysis seeks out general flaws in the way an SQL statement is written. The rules-based analysis may also seek out general flaws in how a schema is designed. Either type of general flaw may prevent desirable (e.g., optimal) execution plans from being available to a query optimizer. A second type of analysis involves a background investigation into the database system to attempt to discover flawed or missing statistics that may mislead a query optimizer. A mislead query optimizer may yield poor performance. Although valuable, both analyses associated with the conventional SQL tuning logic are limited by the costing model employed by the tuning logic. The limitations arise, at least in part, because cost-based query optimization is an inexact science that relies on assumptions that may be made on incorrect and/or stale statistics. Important facts about a plan may be unknown to a cost based tuning logic, which limits the capabilities of a purely cost-based automatic SQL tuner. Similar issues may arise with other conventional single-approach optimizers.

A conventional CBO may consider a large number (e.g., 1000) of possibilities for executing an SQL statement. The CBO may cost each of the possibilities and then select the lowest cost possibility. While providing a good solution for the possibilities it considers, the CBO may not consider a complete set of execution plans. Considering a complete set of plans could require more than an allowed amount of processing time. Similarly, a conventional RBO may consider a large number of possibilities for executing an SQL statement. Once again, while valuable, the analysis may be incomplete.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
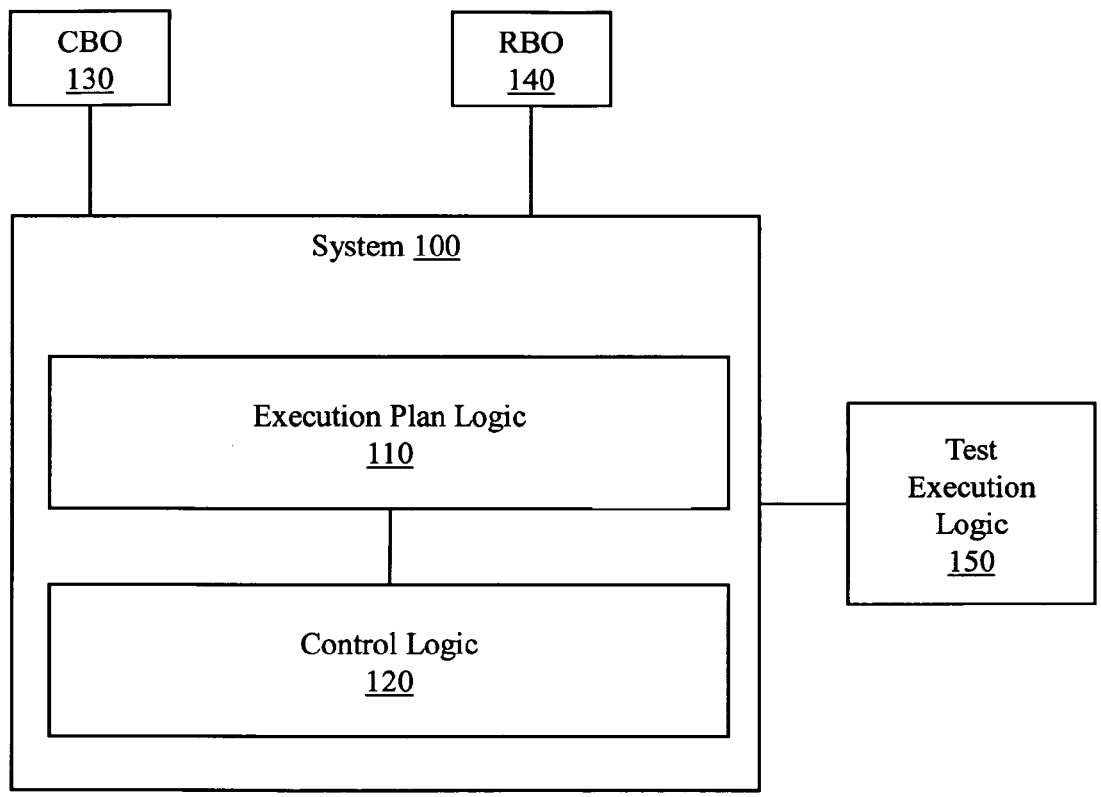
FIG. 1 illustrates an example system associated with hybrid optimization strategies in automatic SQL tuning.

Example systems and methods address the issue that architecting an automatic SQL tuner with a single approach makes it practically impossible to be correct with respect to query optimization one hundred percent of the time. Example systems and methods receive and analyze a set of candidate execution plans that is larger and more diverse than sets analyzed by conventional approaches. Example systems and methods accept execution plans for consideration from multiple sources including, for example, a cost based optimizer, a previous version of a cost based optimizer, a rules based optimizer, an automatic SQL tuner, an entirely different query optimizer, and so on. Example systems and methods then test execute the candidate plans to determine a verifiably optimal execution plan. The test execution may be performed by a test execution logic like that described in the related application titled "Test Execution Of User SQL In Database Server Code". Thus, the test execution occurs in a reproduced execution environment that reproduces at least a portion of an execution environment in which the User SQL runs. The automatic SQL tuning performed by example systems and methods may be performed for only a small percentage of SQLs on a system. Knowledge acquired prior to one execution of an SQL may be used when the SQL is executed again at a later time. Thus, example systems and methods may find an optimization strategy that works well for an SQL statement and then reuse that strategy.

Consider that a CBO may consider a hundred execution plans for running an SQL statement. These execution plans will be considered based on cost only. Consider also that an RBO may have a finite set of rules for running an SQL. Neither the CBO nor the RBO is guaranteed to yield an optimal execution plan. Further consider that an automatic SQL tuner may provide additional inputs and ideas for how an SQL statement is to be executed. Example systems and methods collect execution suggestions from multiple sources (e.g., CBO, RBO, automatic SQL tuner) and control a test execution logic to test execute the candidates to select an execution plan to run. The execution plan may be identified as being the "best" execution plan with respect to certain selection criteria (e.g., performance time, resources consumed). The set of inputs may include execution plans recommended by various versions of a CBO, RBO, automatic SQL tuner, and so on. More generally, the set of inputs may include execution plans recommended by numerous varies query optimizers. For example, the set of inputs may include execution plans recommended by a CBO and/or RBO that has been constrained in a configured way. A first instance of a CBO may be configured with a first set of costs for system resources while a second instance of a CBO may be configured with a second set of costs for system resources. Similarly, a first instance of an RBO may be configured to only use a first subset of rules available to the RBO while a second instance of the RBO may be configured to only use a second subset of rules available to the RBO. Conventional systems typically used either a CBO or an RBO, did not consider multiple execution plans from multiple sources, and had no way to compare the performance of the different suggestions. Example systems perform a test execution on a large, diverse set of candidate execution plans, which facilitates resolving issues associated with stale data, incorrect assumptions, outdated rules, and so on.

Example systems and methods may select an execution plan based on a comparison of the actual time to execute different candidate execution plans. Since candidate execution plans can, most generally, be received from arbitrary, generic optimizers, there may be no single common measurement available to compare plans. Test executing and comparing execution times resolves this common measurement issue. Keeping certain factors (e.g., bind values, system environment) constant during the test executions increases confidence that performance differences are related to the test executed plan. Recall that only a small percentage of SQLs on a system may be test executed. Knowledge gained from these test executions may be applied to future SQL executions to avoid the cost of executing multiple plans for an SQL before deciding on an execution plan for a first execution.

Example systems and methods consider candidate execution plans from a variety of sources and select an execution plan based on test executions of candidate plans. For example, suggestions from conventional tools (e.g., CBO, RBO) may be compared to each other and to additional execution plans from other sources using a test execution logic. Example systems and methods therefore mitigate issues associated with performance regressions that arise after an upgrade to a database query optimizer. A newer, more recent version of a query optimizer may have newer optimization strategies. Even though the more recent version of the query optimizer has newer optimization strategies and generally may provide superior results, some suggestions produced by the newer version may yield worse performance than the previous version. Thus, example systems and methods may test execute execution plans provided by both the older version of the optimizer and the newer version of the optimizer to facilitate identifying a superior execution plan regardless of whether it was provided by a newer or older optimizer. In another example, the performance of previously executed plans may also be considered. In summary, example systems and methods accept inputs from multiple sources and then test execute the inputs to determine a verifiably correct test execution plan without being constrained to a single tuning strategy.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.

DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

FIG. 1 illustrates a system 100. System 100 includes an execution plan logic 110. Execution plan logic 110 may examine a configurable percentage of the SQL statements available on a system. Execution plan logic 110 is to identify a first set of candidate User SQL execution plans associated with a first query optimizer. The first query optimizer may be, for example, a CBO 130. Identifying the first set of candidate User SQL execution plans may include, for example, receiving a file of plans, receiving a pointer to plans, receiving an object that includes plans and so on. One skilled in the art will appreciate that there are various ways for a logic to identify a plan. The execution plan logic 110 is also to identify a second set of candidate User SQL execution plans associated with a second, different query optimizer. The different query optimizer may be, for example, an RBO 140. While a CBO 130 and an RBO 140 are identified, it is to be appreciated that system 100 may identify execution plans provided by different entities.

Execution plan logic 110 is to selectively provide members of the first set of candidate execution plans and members of the second set of candidate execution plans to a test execution logic 150. In one example, test execution logic 150 may perform in accordance with the test execution systems and methods described in the related application "Test Execution Of User SQL In Database Server Code". Thus, execution plan logic 110 is to control the test execution logic 150 to test execute execution plans in server code in a reproduced execution environment that reproduces at least a portion of an execution environment in which the User SQL runs. Therefore, the test execution logic 150 will test execute the provided members of the first set of candidate execution plans and the provided members of the second set of candidate execution plans. Test execution logic 150 will provide a test execution data concerning the executed test plans. In one example, the test execution data includes information concerning execution time for the User SQL, and/or resources consumed by the User SQL.

Execution plan logic 110 is also to determine a selected execution plan based, at least in part, on the test execution data. In one example, the selected execution plan will be the plan that executes fastest. In another example, the selected execution plan will be the plan that consumes the fewest resources. In yet another example, the selected execution plan will be the plan that maximizes a utility measure that includes both execution time and resource consumption.

System 100 also includes a control logic 120. Control logic 120 is to control a database server to test execute the User SQL using the selected execution plan. Controlling the database server may include, for example, specifying time limits, choosing relevant metrics for performing a comparison, persisting test execution data to facilitate making follow-on decisions, and so on.

Figure 2:
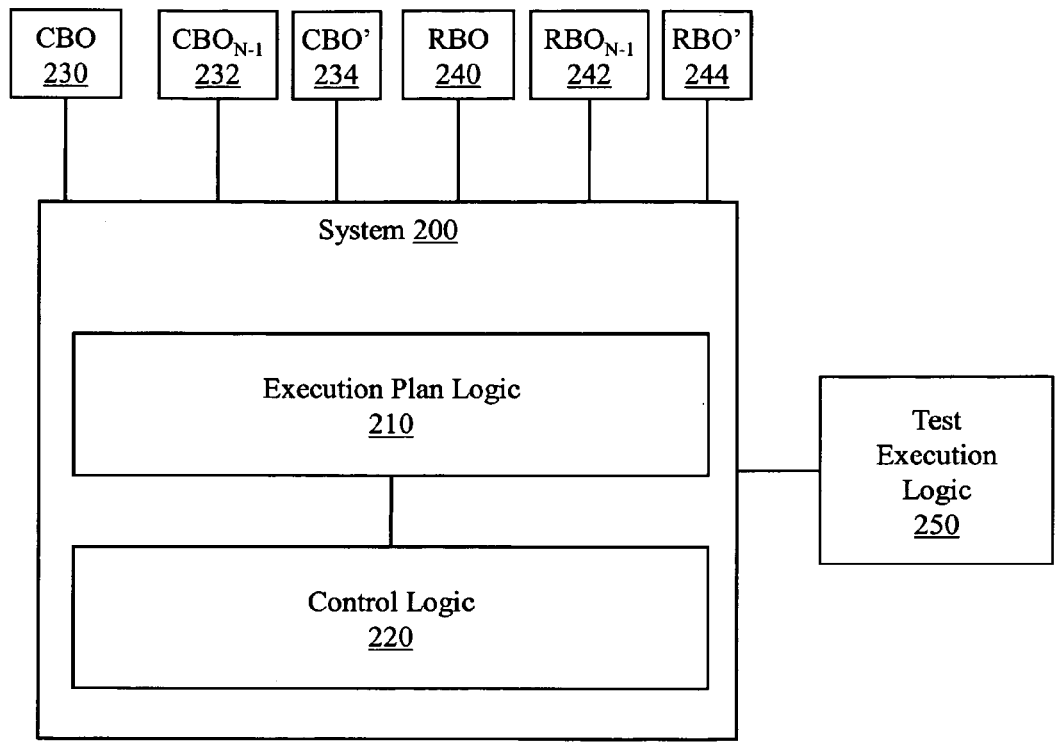
FIG. 2 illustrates another example system associated with hybrid optimization strategies in automatic SQL tuning.

FIG. 2 illustrates a system 200 that includes some elements similar to those described in connection with system 100 (FIG. 1). For example, system 200 includes an execution plan logic 210 and a control logic 220. Additionally, system 200 interacts with a CBO 230, an RBO 240, and a test execution logic 250. However, the execution plan logic 210 is configured to perform additional actions.

For example, the execution plan logic 210 may receive additional candidate execution plans for the User SQL. The additional candidate execution plans may be received, for example, from a vintage $CBO_{N-1}$ optimizer 232. The vintage $CBO_{N-1}$ 232 is referred to using the annotation N-1 to indicate that it is an older version of CBO 230, which may be considered the Nth version of a CBO. While a single vintage $CBO_{N-1}$ 232 is illustrated, it is to be appreciated that a greater number of vintage CBOs may provide execution plans to system 200. This facilitates eliminating regression issues where a newer CBO may provide worse performance in certain circumstances than an older CBO since actual performance of execution plans are compared. Execution plan logic 210 may also receive a candidate execution plan from a constrained CBO' 234. A constrained CBO may have certain costs fixed or manipulated to influence cost based decisions.

Execution plan logic 210 may also receive a candidate execution plan from a vintage $RBO_{N-1}$ 242. A vintage RBO is similar to a vintage CBO in that it may be an older version of an RBO for which a newer version is available. Once again, to prevent regressions, plans from both the current and older version(s) of an RBO may be provided to test execution logic 250 by execution plan logic 210. Execution plan logic 210 may also receive a candidate execution plan from a constrained RBO' 244. A constrained RBO may be configured to only execute a subset of available rules. Actual performance of candidate execution plans facilitates preventing regression issues.

With this rich set of candidate plans available, execution plan logic 210 may selectively provide additional candidate execution plans for the User SQL to the test execution logic 250. Test execution logic 250 may provide test execution data (e.g., run time, resources consumed) on which a decision concerning a preferred execution plan may be made. Thus, system 200 differs from conventional systems not only because it considers test execution plans from multiple sources, but also because the test execution plans are actually executed in a similar environment to facilitate comparison and selection of a preferred execution plan.

Figure 3:
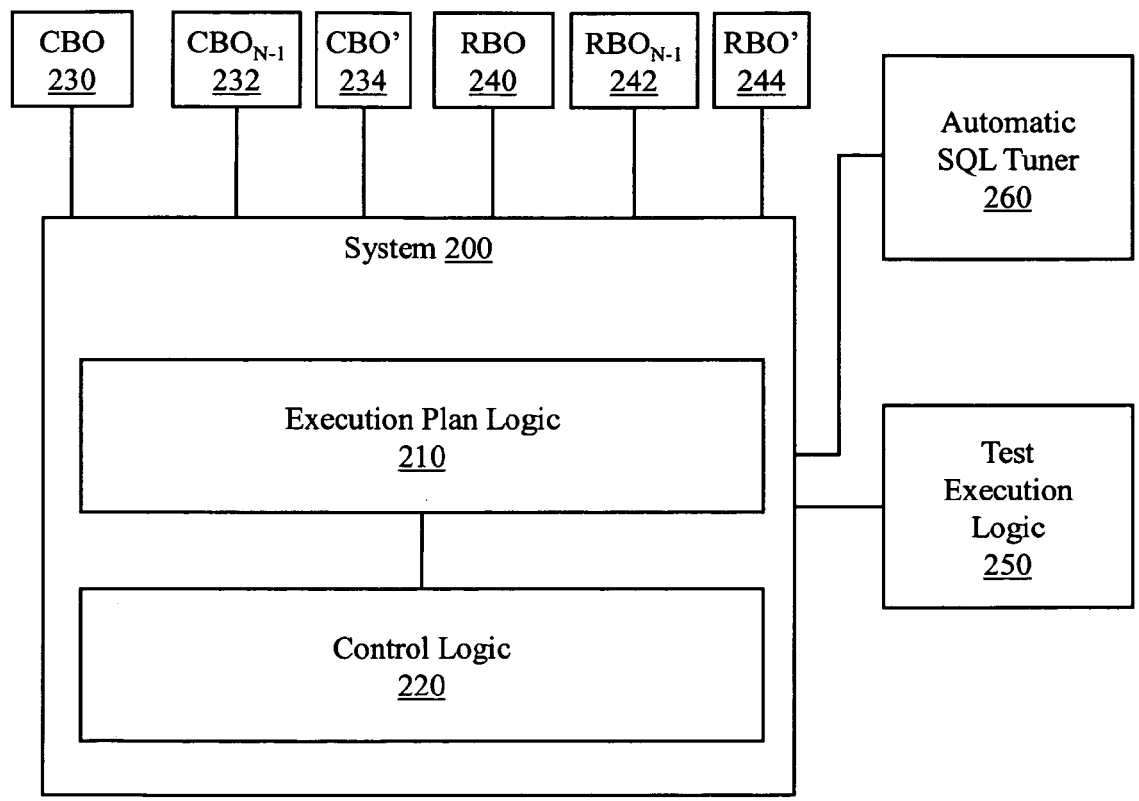
FIG. 3 illustrates another example system associated with hybrid optimization strategies in automatic SQL tuning.

FIG. 3 illustrates another embodiment of system 200. In this embodiment, the execution plan logic 210 may also receive a supplemental candidate execution plan(s) for the User SQL from an automatic SQL tuner 260. The automatic SQL tuner 260 may store information about previous executions of a User SQL associated with various execution plans. Execution plan logic 210 may, therefore, selectively provide a supplemental candidate execution plan received from the automatic SQL tuner 260 to the test execution logic 250.

In one example, the execution plan logic 210 may receive execution plans from two or more of the CBO 230, $CBO_{N-1}$ 232, CBO' 234, RBO 240, $RBO_{N-1}$ 242, RBO' 244, and automatic SQL tuner 260. In another example, the execution plan logic 210 may receive execution plans from all of the CBO 230, $CBO_{N-1}$ 232, CBO' 234, RBO 240, $RBO_{N-1}$ 242, RBO' 244, and automatic SQL tuner 260. Thus, in different examples, the execution plan logic 210 may provide a rich and varied set of execution plans to the test execution logic 250. Therefore, system 200 may make an informed decision on an SQL execution plan that compares various plans provided by various (e.g., CBO, RBO) optimization strategies.

Figure 4:
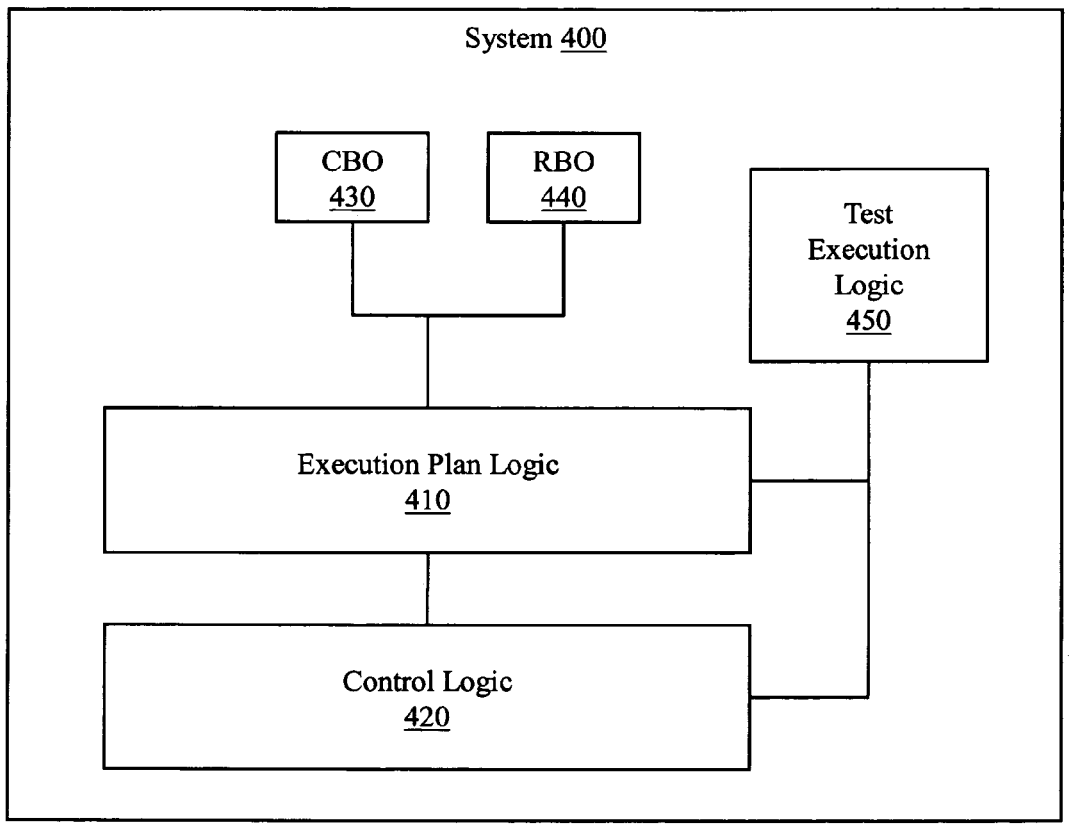
FIG. 4 illustrates another example system associated with hybrid optimization strategies in automatic SQL tuning.

FIG. 4 illustrates a system 400. Whereas system 100 (FIG. 1) interacted with a CBO 130, an RBO 140, and a test execution logic 150, system 400 includes a CBO 430, an RBO 440, and a test execution logic 450. While a single CBO 430, a single RBO 440, and a single test execution logic 450 are illustrated, it is to be appreciated that system 400 may include other optimizers like those described above.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
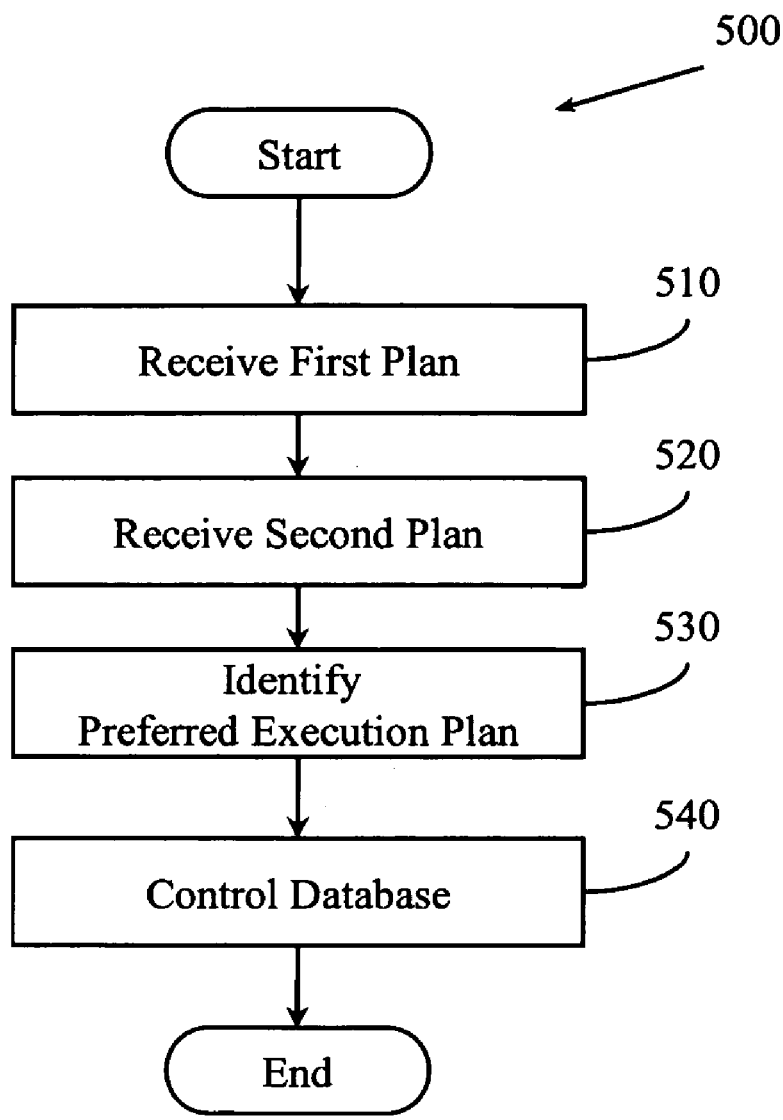
FIG. 5 illustrates an example method associated with hybrid optimization strategies in automatic SQL tuning.

FIG. 5 illustrates a method 500 associated with a hybrid approach for automatic SQL tuning. Method 500 includes, at

510, receiving a cost-based execution plan for a User SQL. The cost-based execution plan may be received, for example, from a cost-based query optimizer. Receiving the cost-based execution plan may include, for example, receiving a file that includes a plan, receiving a pointer to a plan, receiving an object that encapsulates a plan and so on. One skilled in the art will appreciate that there are numerous ways to receive a plan.

Method 500 also includes, at 520, receiving a rules-based execution plan for the User SQL. The rules-based plan may be received, for example, from a rules-based query optimizer. Once again, the plan may be received in various ways. It is to be appreciated that in one embodiment method 500 may receive execution plans from arbitrary, generic optimizers that may or may not include rules-based and/or cost-based optimizers.

Method 500 also includes, at 530, identifying a preferred execution plan. Since a cost-based plan and a rules-based plan are available, method 500 will distinguish between the plans based, at least in part, on a test execution of the plans. The test execution will occur in a reproduced execution environment that reproduces at least a portion of an execution environment in which the user SQL runs. In one example, method 500 may include controlling a test execution process to perform the test execution while in another example method 500 may perform the test execution itself.

Method 500 also includes, at 540, controlling a database to execute the User SQL using the preferred execution plan. Controlling the database to execute the User SQL using the preferred execution plan may include, for example, specifying time limits, choosing relevant metrics for a comparison of execution plans, and persisting test execution data to facilitate making follow-on decisions based on the test execution data and so on.

While FIG. 5 illustrates various actions occurring in serial, it is to be appreciated that various actions illustrated in FIG. 5 could occur substantially in parallel. By way of illustration, a first process could receive execution plans, a second process could identify a preferred execution plan, and a third process could control a database to execute a User SQL using the preferred execution plan. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 500. While executable instructions associated with the method 500 are described as being stored on a computer-readable medium, it is to be appreciated that executable instructions associated with other example methods described herein may also be stored on a computer-readable medium.

Figure 6:
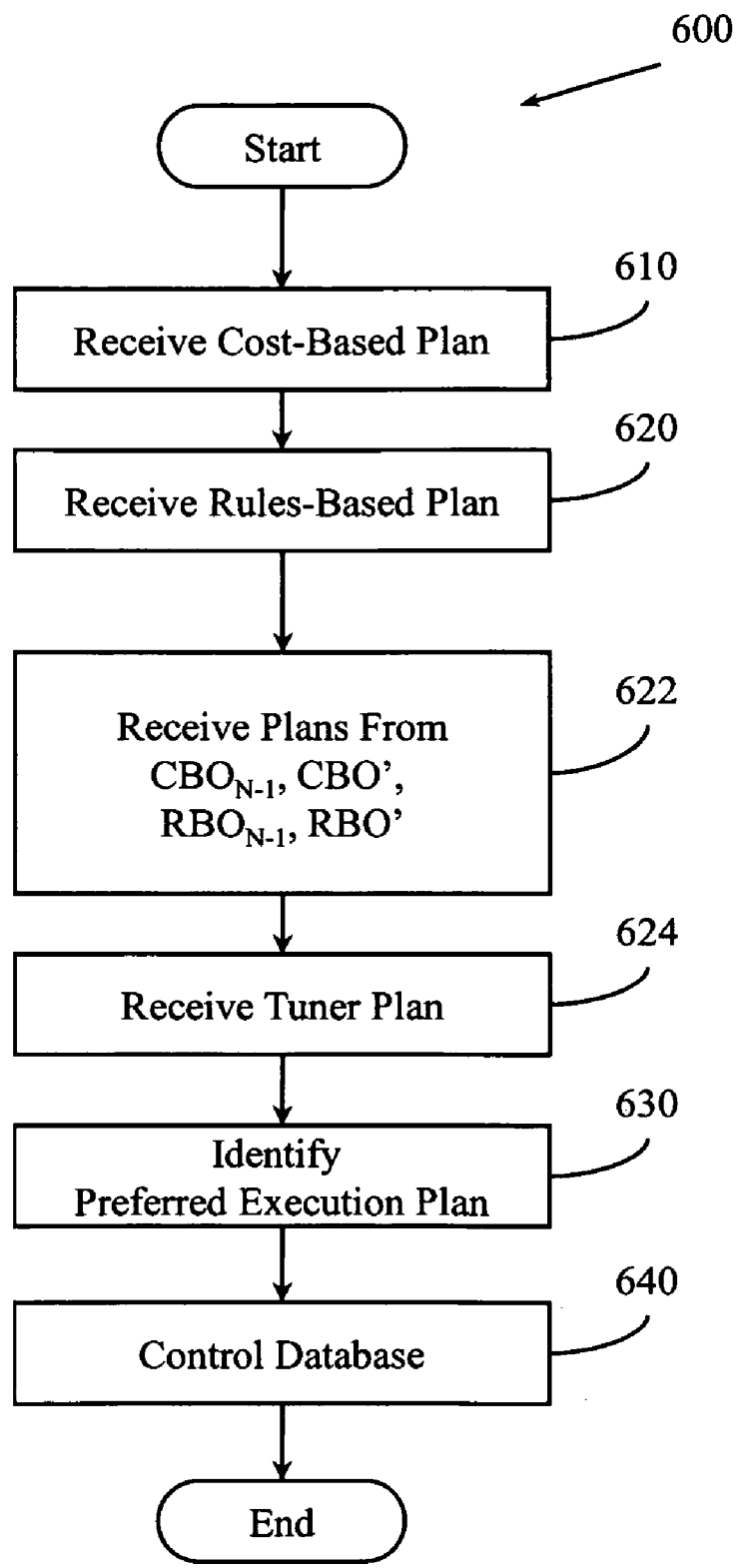
FIG. 6 illustrates another example method associated with hybrid optimization strategies in automatic SQL tuning.

FIG. 6 illustrates a method 600 associated with heuristic-based automatic SQL tuning based on hybrid strategies. Method 600 includes four actions similar to those described in connection with method 500 (FIG. 5). For example, method 600 includes receiving a cost-based plan at 610, receiving a rules-based plan at 620, identifying a preferred execution plan at 630, and controlling a database at 640. However method 600 includes additional actions.

For example, method 600 includes, at 622, receiving additional execution plans. Receiving the additional execution plans at 622 may include receiving a predecessor cost-based execution plan for the User SQL, receiving a constrained cost-based execution plan for the User SQL, receiving a predecessor rules-based execution plan for the User SQL, and/or receiving a constrained rules-based execution plan for the User SQL. In one example, plans associated with predecessor optimizers may be received to prevent regressions while in another example plans associated with constrained optimizers may be received to test various "what-if" scenarios. In one example, plans may be received from all the identified optimizers. While a rich set of optimizers are described, it is to be appreciated that in one embodiment, method 600 may receive execution plans from a varied set of generic, arbitrary query optimizers that may or may not include cost and/or rules-based optimizers.

Thus, identifying the preferred execution plan at 630 may be based, at least in part, on test executing a cost-based execution plan, a predecessor cost-based execution plan, a constrained cost-based execution plan, a rules-based execution plan, a predecessor rules-based execution plan, and a constrained rules-based execution plan. The test execution may provide execution data concerning execution time, resources consumed, and so on.

Method 600 may also include, at 624, receiving a structured query language tuner execution plan for the User SQL. The tuner execution plan may include information associated with previous executions of a User SQL. In this example, identifying the preferred execution plan at 630 may also include executing the structured query language tuner execution plan.

Figure 7:
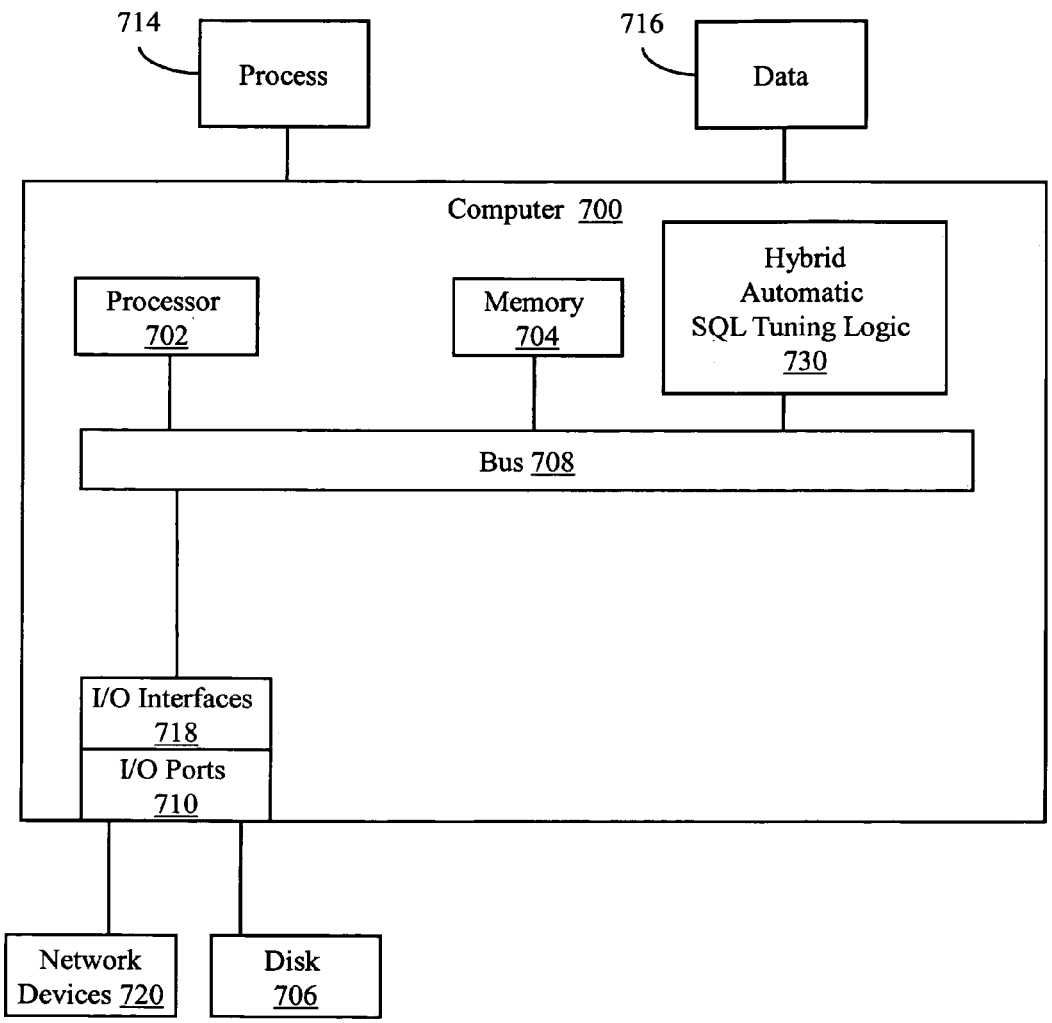
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a heuristics based automatic SQL tuning logic 730 configured to facilitate selecting a test execution plan from a diverse set of test execution plans for a user SQL. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702. Thus, logic 730 may provide means (e.g., hardware, software, firmware) for identifying execution plans for a User SQL, where the execution plans are associated with different query optimizers (e.g., rules-based, cost-based, versioned). Logic 730 may also provide means (e.g., hardware, software, firmware) for controlling a test execution logic to test execute the test execution plans. The test execution logic may execute the plans in server code in a reproduced execution environment that reproduces at least a portion of an execution environment in which the user SQL runs. The test execution logic is to produce a test execution data in response to test executing the test execution plans. Logic 730 may also provide means (e.g., hardware, software, firmware) for storing a preferred execution plan that is selected based on the test execution data.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
an execution plan logic configured to:
identify a first set of execution plans associated with a first query optimizer;
identify a second set of execution plans associated with a second, different query optimizer, where the first and second sets of execution plans are for a Structured Query Language (SQL) query;
test execute a subset of execution plans from the first set and the second set and provide test execution data for the subset of execution plans based, at least in part, on the test executing; and
select an execution plan from the subset based, at least in part, on the test execution data; and
a control logic configured to control a database to execute the SQL query using the execution plan.

2. The system of claim 1, where the execution plan logic is configured to provide the subset of execution plans to a test execution logic to perform the test executing and the test execution data includes data for each execution plan in the subset that describes performance factors of the test executing.

3. The system of claim 1, where the test executing includes executing the subset of execution plans in a test environment that maintains a constant system environment to facilitate determining performance differences between the execution plans in the subset of execution plans.

4. The system of claim 1, where the first query optimizer is a cost-based optimizer and where the second query optimizer is a rules-based optimizer.

5. The system of claim 4, where the execution plan logic is configured to:
receive at least one additional execution plan for the SQL query from one or more of, a vintage cost-based optimizer, a constrained cost-based optimizer, a vintage rules-based optimizer, and a constrained rules-based optimizer; and
selectively provide one or more of the at least one additional execution plan for the SQL query to the test execution logic.

6. The system of claim 5, where the execution plan logic is configured to:
receive one or more supplemental execution plans for the SQL query from an automatic SQL tuner; and
selectively provide one or more of the supplemental execution plans for the SQL query to the test execution logic.

7. The system of claim 4, where the execution plan logic is configured to:
receive at least one additional execution plan for the SQL query from each of, a vintage cost-based optimizer, a constrained cost-based optimizer, a vintage rules-based optimizer, and a constrained rules-based optimizer; and
selectively provide the at least one additional execution plan for the SQL query to the test execution logic.

8. The system of claim 1, where the execution plan logic selects an execution plan by applying a heuristic to the test execution data to determine which execution plan in the subset is optimal.

9. The system of claim 8, where the heuristic compares the test execution data for each execution plan in the subset to determine which plan is optimal.

10. The system of claim 1, where the execution plan indicates at least one of, a time limit for executing the SQL query, a reconfiguration of the SQL query, and an index to use with the SQL query.

11. The system of claim 1, where the test execution data includes execution times for the SQL query using the subset, and resources consumed by the SQL query using the subset.

12. A non-transitory computer-readable medium storing computer-executable instructions that when executed by a computer cause the computer to perform a method, the method comprising:
    receiving a cost-based execution plan for a user structured query language statement (User SQL) from a cost-based query optimizer;
    receiving a rules-based execution plan for the User SQL from a rules-based query optimizer;
    identifying a preferred execution plan based, at least in part, on test executing the cost-based execution plan in a reproduced execution environment that reproduces at least a portion of an execution environment in which the user SQL runs and test executing the rules-based execution plan in the reproduced execution environment; and
    controlling a database to execute the User SQL using the preferred execution plan.

13. The non-transitory computer-readable medium of claim 12, including receiving a predecessor cost-based execution plan for the User SQL and identifying the preferred execution plan based, at least in part, on executing the cost-based execution plan and the predecessor cost-based execution plan.

14. The non-transitory computer-readable medium of claim 12, including receiving a constrained cost-based execution plan for the User SQL and identifying the preferred execution plan based, at least in part, on executing the cost-based execution plan and the constrained cost-based execution plan.

15. The non-transitory computer-readable medium of claim 12, including receiving a predecessor rules-based execution plan for the User SQL and identifying the preferred execution plan based, at least in part, on executing the rules-based execution plan and the predecessor rules-based execution plan.

16. The non-transitory computer-readable medium of claim 12, including receiving a constrained rules-based execution plan for the User SQL and identifying the preferred execution plan based, at least in part, on executing the rules-based execution plan and the constrained rules-based execution plan.

17. The non-transitory computer-readable medium of claim 12, including receiving a structured query language tuner execution plan for the User SQL and identifying the preferred execution plan based, at least in part, on executing the structured query language tuner execution plan.

18. The non-transitory computer-readable medium of claim 12, including receiving a predecessor cost-based execution plan for the User SQL, receiving a constrained cost-based execution plan for the User SQL, receiving a predecessor rules-based execution plan for the User SQL, receiving a constrained rules-based execution plan for the User SQL, and identifying the preferred execution plan based, at least in part, on test executing the cost-based execution plan, the predecessor cost-based execution plan, the constrained cost-based execution plan, the rules-based execution plan, the predecessor rules-based execution plan, and the constrained rules-based execution plan.

19. The non-transitory computer-readable medium of claim 18, including receiving a structured query language tuner execution plan for the User SQL and identifying the preferred execution plan based, at least in part, on executing the structured query language tuner execution plan.

20. A non-transitory computer-readable medium storing computer-executable instructions that when executed by a computer cause the computer to perform a method, the method comprising:
    identifying at least two test execution plans for a database query, where a first test execution plan is associated with a first query optimizer and where a second test execution plan is associated with a second, different query optimizer;
    providing test execution data concerning the at least two execution plans based on test executing the database query using the at least two execution plans in a reproduced execution environment that is not a production execution database environment; and
    storing a preferred execution plan selected from the at least two test execution plans based on the test execution data.

* * * * *